United States Patent
Feezell et al.

(10) Patent No.: US 11,153,338 B2
(45) Date of Patent: Oct. 19, 2021

(54) PREVENTING NETWORK ATTACKS

(71) Applicant: International Business Machines Corporation, Armonk, NY (US)

(72) Inventors: John Richard Feezell, Pikeville, TN (US); Cesar Augusto Rodriguez Bravo, Alajuela (CR); Wayne Francis Tackabury, West Tisbury, MA (US); Edgar Adolfo Zamora Duran, Heredia (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 16/429,738

(22) Filed: Jun. 3, 2019

(65) Prior Publication Data

US 2020/0382538 A1 Dec. 3, 2020

(51) Int. Cl.
*H04L 29/06* (2006.01)

(52) U.S. Cl.
CPC ........ *H04L 63/1425* (2013.01); *H04L 63/126* (2013.01); *H04L 63/1416* (2013.01); *H04L 63/1433* (2013.01); *H04L 63/1441* (2013.01)

(58) Field of Classification Search
CPC ............... H04L 63/1425; H04L 63/126; H04L 63/1433; H04L 63/1416; H04L 63/1441; H04L 63/0236; H04L 67/12
USPC ........................................................ 726/22
See application file for complete search history.

(56) References Cited

U.S. PATENT DOCUMENTS

| | | | | |
|---|---|---|---|---|
| 7,716,739 B1 * | 5/2010 | McCorkendale | ... | H04L 63/1425 726/23 |
| 7,957,372 B2 * | 6/2011 | Boulanger | .......... | H04L 63/1416 370/389 |
| 8,484,744 B1 | 7/2013 | De et al. | | |
| 8,654,655 B2 * | 2/2014 | Filho | ................... | H04L 63/1416 370/244 |
| 8,898,788 B1 * | 11/2014 | Aziz | ..................... | G06F 21/554 726/24 |

(Continued)

OTHER PUBLICATIONS

Parres-Peredo et al., "MapReduce approach to build network user profiles with top-k rankings for network security", 2018 9th IFIP International Conference on New Technologies, Mobility and Security (NTMS), Feb. 26-28, 2018, 5 pages.

(Continued)

*Primary Examiner* — Badri Narayanan Champakesan
(74) *Attorney, Agent, or Firm* — William Hartwell; Andrew D. Wright; Roberts Calderon Safran & Cole, P.C.

(57) ABSTRACT

Embodiments are disclosed for preventing network attacks. The techniques include generating a usage profile for a computing device that accesses a network. The techniques also include determining a plurality of actual use real-time indicators for a network connection on the network. The techniques further include determining a plurality of expected use real-time indicators for the network connection. Additionally, the techniques include calculating a risk assessment value for the network connection based on the actual use real-time indicators and the expected use real-time indicators. Further, the techniques include performing a security action for the network connection based on the calculated risk assessment value.

11 Claims, 13 Drawing Sheets

(56) References Cited

U.S. PATENT DOCUMENTS

| | | | |
|---|---|---|---|
| 9,009,825 B1* | 4/2015 | Chang | H04L 63/1425 726/22 |
| 9,077,713 B1* | 7/2015 | Zheng | G06F 21/36 |
| 9,191,400 B1* | 11/2015 | Ptasinski | H04L 67/322 |
| 9,280,911 B2 | 3/2016 | Sadeh-Koniecpol et al. | |
| 9,306,964 B2* | 4/2016 | Singhal | H04L 63/0218 |
| 9,336,385 B1* | 5/2016 | Spencer | G06F 21/56 |
| 9,338,187 B1* | 5/2016 | Oprea | G06F 21/316 |
| 9,363,280 B1* | 6/2016 | Rivlin | H04L 63/1433 |
| 9,703,962 B2* | 7/2017 | Salajegheh | G06F 21/552 |
| 10,003,607 B1* | 6/2018 | Man | G06F 21/316 |
| 10,044,727 B2 | 8/2018 | Bender et al. | |
| 10,075,461 B2* | 9/2018 | Mumcuoglu | H04L 63/1408 |
| 10,129,211 B2 | 11/2018 | Heath | |
| 2002/0124187 A1* | 9/2002 | Lyle | H04L 63/1458 726/22 |
| 2003/0084319 A1* | 5/2003 | Tarquini | H04L 63/1416 726/23 |
| 2003/0084349 A1* | 5/2003 | Friedrichs | H04L 63/1408 726/22 |
| 2004/0230834 A1* | 11/2004 | McCallam | H04L 67/306 726/23 |
| 2005/0018618 A1* | 1/2005 | Mualem | H04L 63/1458 370/252 |
| 2008/0052780 A1* | 2/2008 | Cao | G06F 21/554 726/23 |
| 2009/0320101 A1 | 12/2009 | Doyle, III et al. | |
| 2010/0011029 A1* | 1/2010 | Niemela | H04L 63/145 707/E17.044 |
| 2010/0262873 A1* | 10/2010 | Chang | H04L 29/12783 714/57 |
| 2011/0023118 A1* | 1/2011 | Wright | G06F 11/28 726/23 |
| 2011/0167491 A1* | 7/2011 | Ruggerio | G06F 21/552 726/23 |
| 2012/0180133 A1* | 7/2012 | Al-Harbi | H04L 63/1433 726/25 |
| 2012/0255019 A1* | 10/2012 | McNamee | H04L 63/1416 726/24 |
| 2013/0305357 A1* | 11/2013 | Ayyagari | H04B 7/18593 726/22 |
| 2014/0123278 A1* | 5/2014 | Thubert | H04L 63/1458 726/23 |
| 2014/0282977 A1 | 9/2014 | Madhu et al. | |
| 2014/0324719 A1 | 10/2014 | Canal | |
| 2014/0337972 A1* | 11/2014 | Foster | H04L 67/306 726/22 |
| 2015/0128274 A1* | 5/2015 | Giokas | H04L 63/1425 726/23 |
| 2015/0188937 A1* | 7/2015 | Wu | H04L 63/1416 726/22 |
| 2015/0324616 A1* | 11/2015 | Alarabi | H04L 63/0876 726/25 |
| 2015/0381651 A1* | 12/2015 | Lietz | G06F 21/57 726/23 |
| 2016/0004826 A1* | 1/2016 | Van Arkel | G16H 40/20 705/3 |
| 2016/0134645 A1* | 5/2016 | Kadashevich | G06F 21/552 726/26 |
| 2016/0142435 A1* | 5/2016 | Bernstein | H04L 63/1441 726/23 |
| 2016/0285897 A1* | 9/2016 | Gantman | H04L 63/145 |
| 2016/0381070 A1* | 12/2016 | Zhang | H04L 63/1408 726/23 |
| 2017/0118187 A1* | 4/2017 | El Khoury | H04L 67/12 |
| 2018/0026999 A1* | 1/2018 | Ruvio | H04L 41/0631 726/23 |
| 2018/0144139 A1 | 5/2018 | Cheng et al. | |
| 2018/0332064 A1* | 11/2018 | Harris | G06F 15/16 |
| 2019/0098021 A1* | 3/2019 | Farmer | H04L 63/20 |

OTHER PUBLICATIONS

Singh et al., "An intrusion detection system using network traffic profiling and online sequential extreme learning machine", Expert Systems with Applications, vol. 42, Issue 22, Dec. 1, 2015, Abstiact Only, 2 pages.

Qin et al., "MUCM: Multilevel User Cluster Mining Based on Behavior Profiles for Network Monitoring", IEEE Systems Journal, vol. 9, No. 4, Dec. 2015, pp. 1322-1333.

IBM, "User Behavior Analytics app", IBM Knowledge Center, printed Mar. 15, 2019, 3 pages.

Lai, "Intelligent Online Risk-Based Authentication using Bayesian Network Model", A Thesis Submitted in Partial Fulfillment of the Requirements for the Degree of Master of Applied Science in the Electrical and Computer Engineering, University of Victoria, 2008, 99 pages.

Mell et al., "The NIST Definition of Cloud Computing", Recommendations of the National Institute of Standards and Technology, Sep. 2011, 7 pages.

* cited by examiner

PREVENTING NETWORK ATTACKS

BACKGROUND

The present invention relates to cyber network attacks, and more specifically, to preventing network attacks.

Smart buildings and cities, the Internet of Things, ever increasing numbers of personal data devices (phones, wearables, etc.), and the proliferation of ubiquitous network connectivity provides a fertile attack surface for all manner of cybercriminal activity, including network attacks, such as, impersonation attacks. Impersonation attacks can be attempts by a malicious actor to use a target computing device in order to impersonate the user of the device.

SUMMARY

Embodiments are disclosed for preventing network attacks. The techniques include generating a usage profile for a computing device that accesses a network. The techniques also include determining a plurality of actual use real-time indicators for a network connection on the network. The techniques further include determining a plurality of expected use real-time indicators for the network connection. Additionally, the techniques include calculating a risk assessment value for the network connection based on the actual use real-time indicators and the expected use real-time indicators. Further, the techniques include performing a security action for the network connection based on the calculated risk assessment value.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
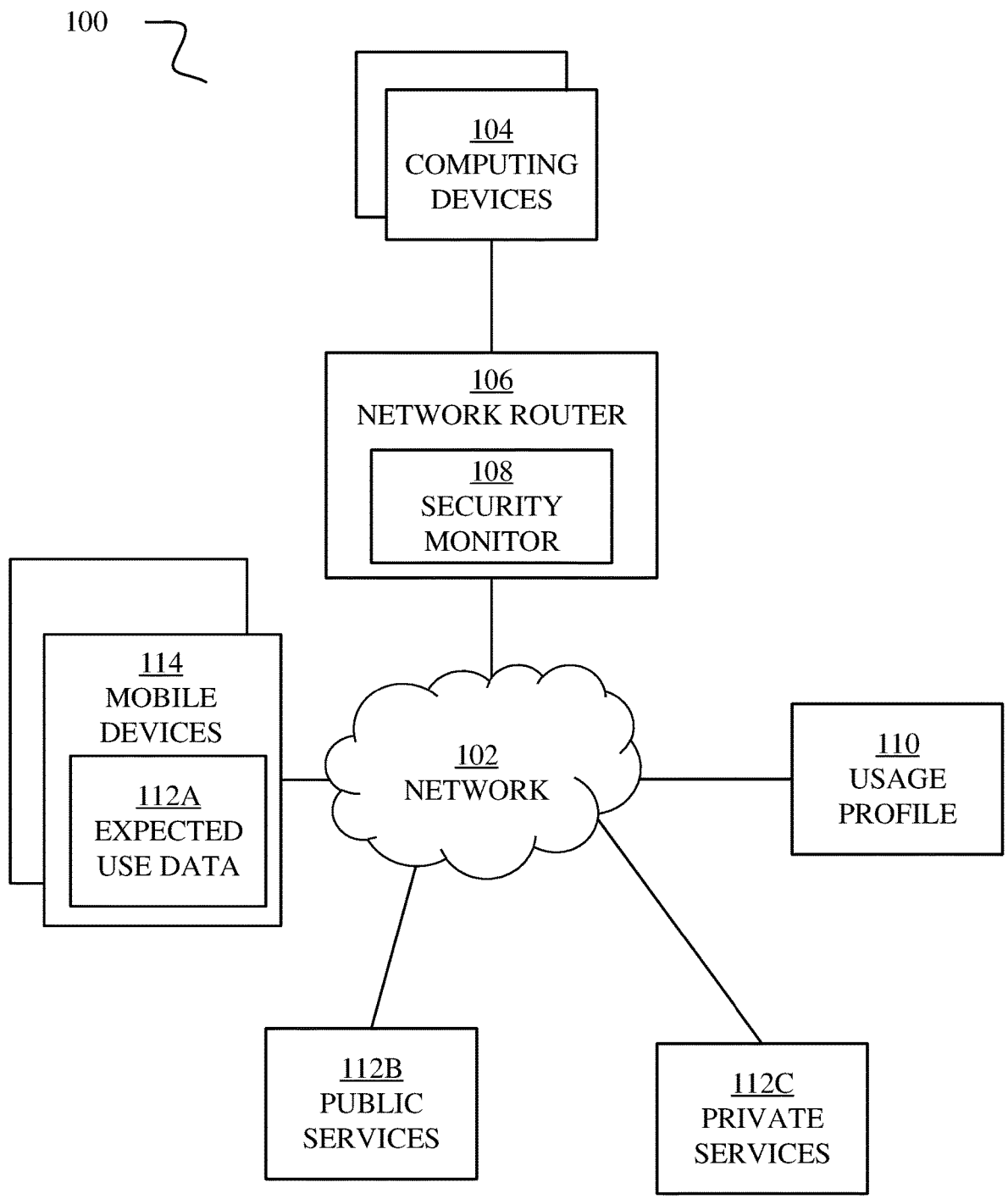
FIG. 1 illustrates a block diagram of a system for preventing network attacks, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Examples of network attacks include data exfiltration and ransom attacks, which rely heavily on the elements of surprise and secrecy. Data exfiltration is the unauthorized copying of information from a target's network to a location that a malicious actor controls. In a ransom attack, the malicious actor threatens to destroy valuable data on a target computer unless a ransom is paid. Because cybercriminal activities such as these can rely on the elements of surprise and secrecy, it would be useful for Internet and network-connected users to have an intelligent sentry that is continuously watching over network connections for potential attacks.

Accordingly, embodiments of the present disclosure can autonomously adapt to the unique usage patterns of a network environment, while remaining informed through a variety of external data sources through analysis and learning. In light of these learned and collected inputs, this analysis of network traffic can allow for real-time reaction to potential attacks in the form of a number of defined responses. These defined responses can range from instant alerting to automatic port or pipe lock down. Port and pipe lock downs can involve shutting down the network connections over which the potential attacks can take place.

Embodiments of the present disclosure can also provide subscriber security through the identification of traffic outside of a user and temporal-based profile. For example, significant volumes of traffic sent to a simple mail transfer protocol (SMTP) port, e.g., port 25, during a period that is identified as the subscriber's sleeping hours within a local time zone may not be associated with some other off-peak activity such as offline backup, but possibly the initiation of spamming agent activity. Accordingly, such traffic volumes could provide forensic evidence to justify terminating the spamming process initiation chain.

Referring now to FIG. 1, which is a block diagram of a system 100 for preventing network attacks, in accordance with embodiments of the present disclosure. The system 100 includes a network 102, computing devices 104, network router 106, security monitor 108, usage profile 110, expected use data 112A, public services 112B, private services 112C, and mobile devices 114. The network 102 can be any network or collection of networks, including, for example, a local area network, and a wide area network, such as the Internet.

The computing devices 104 can be computing devices including, but not limited to, desktop computers, laptop computers, tablets, smartphones, and wearable computing devices. The computing devices 104 can be connected to the network 102 through a network router 106. The network router 106 can be a networking device that forwards data packets between the computing devices 104 and the network 102.

According to embodiments of the present disclosure, the network router 106 can include a security monitor 108. The security monitor 108 can be a cognitive system that continuously gathers network traffic data for the computing devices 104 and the network router 106, expected use data 112A, and events information from public services 112B (e.g., sport, art) and private services 112C (e.g., a user's company-related maintenance schedules). The security monitor 108 can use the gathered data to create the usage profile 110, which can be a multidimensional data structure relating the gathered data. Further, the security monitor 108 can use the usage profile 110 and real-time network usage indicators to determine whether a network attack is taking place. According to embodiments of the present disclosure, the security monitor 108 can take different actions based on a calculated risk assessment value. The actions can range from sending the affected user an alert to shutting down one or more ports of the network router 106.

While the security monitor 108 is shown as included in the network router 106, in alternative embodiments, the security monitor 108 can be a stand-alone device that is connected to the network router 106. In other embodiments, the security monitor 108 can be a cloud service, wherein access to the usage of the computing devices 104 and network router 106, usage profile 110, expected use data 112A, public services 112B, and private services 112C can be provided via an application programming interface (API).

The usage profile 110 can provide an indication of how the network 102 is used by the computing devices 104 at specific times of day, and days of the week, month, and year. How the computing devices 104 use the network 102 can be represented by the average bandwidth used, the origin internet protocol (IP) address of connections, the connection type (upload versus download), and the number of network connections. The security monitor 108 can record the origins of network connections to create a historical map of the connections that are used by the computing devices 104. The recorded origins of the network connections can be represented by the IP address and the average bandwidth used over these connections.

Additionally, the usage profile 110 can include thresholds for use. The thresholds can represent tolerable variations from the usage profile parameters. For example, a bandwidth threshold can specify that a 10% variance from the average bandwidth is tolerable, and does not represent a malicious actor.

The expected use data 112A, public services 112B, and private services 112C can include real-time indicators of expected use of the computing devices 104. The expected use data 112A can be any information that is relevant to activity over the network 102, and can be retrieved from various devices, such as wearables, smartphones, personal digital assistants (PDAs), and electronic calendars. Wearables data can include data that helps the security monitor 108 to determine user actions that will help during correlation with other activities. For example, wearables data can indicate whether a human user of the computing devices is awake or sleeping, at home, at the office, or outside of the home and office.

Thus, if the user is sleeping at home, the number of outbound connections over the network 102 increases, and the upload traffic increases above a predetermined threshold, the security monitor 108 can trigger an alert or shutdown action because such connections under this scenario can indicate a remote access attack. Additionally, some attacks are attempted from distant locations in different time zones than the computing devices 104 and network router 106. Accordingly, knowledge of the time zone where the computing devices 104 and network router 106 are located can be useful to discover hacking attempts performed from other countries and time zones.

The mobile devices 114 can include mobile computing devices, such as, smartphones, PDAs, laptops, tablets, wearable devices, and the like. According to embodiments of the present disclosure, if the security monitor 108 detects a potential cyber attack, the security monitor 108 can provide a notification to the affected user by sending an alert message for the user to one or more mobile devices 114. Thus, the mobile devices 114 can be tasked with providing real-time alerts to the user. Further, the feature sets for mobile devices 114, can include settings to deal with managing the alert messages to keep them from being intrusive. For example, smartphones can explicitly manage alert messages for being out of core sleep time, assisted by idle detection on the device, such that a user is not interrupted with such alerts until the user wakes up and interacts with the mobile device 114. In some embodiments, access to the alert messages can be restricted to users that can complete a secondary authentication factor.

The public services 112B can provide useful data relevant to the use of the computing devices 104 that is stored on a public server, such as social media, or a public calendar. Social media for a user of the computing devices 104 can provide an indication of the user's current location, which may be used to determine whether a particular use of bandwidth is related to legitimate use or a malicious actor. Also, having data from an electronic calendar can prevent some false positives if the computing devices 104 are using a relatively large amount of bandwidth while streaming something of interest that is recorded in the electronic calendar. For example, a public calendar can document the dates and times of sporting events, the release of a television show or movie that the user has an interest in watching, national holidays or other celebrations, and the like.

The private services 112C can provide useful data relevant to the use of the computing devices 104 that is stored on a private cloud service, such as a private calendar. For example, a private calendar may include a backup schedule and update schedule for one or more of the computing devices 104. A backup schedule can detail when the computing devices 104 are backed up. Backing up computing devices 104 can provide a copy of useful data and computer applications in the event that such data or computing applications are lost, either by accident or through malicious acts. The update schedule can detail when data and/or computer applications on the computing devices 104 are updated. Updates can keep data and computer applications on the computing devices 104 current, which may be useful in the operation of the computing devices, and in the event of patches to computer applications that develop security issues.

Further, the private calendar can include any scheduled maintenance that could cause bandwidth usage. Scheduled maintenance can be entered manually or through automated scheduling. Knowing when scheduled maintenance takes place can help determine when a relatively large amount of bandwidth usage is caused by some predetermined maintenance on the computing devices 104. In some embodiments, scheduled maintenance dates and time can be obtained automatically if the security monitor 108 has an open API to gather or send the maintenance or update schedule.

In this way, the security monitor 108 can use the usage profile 110, expected use data 112A, public services 112B, and private services 112C to identify potential cybercriminal attacks. Once a potential cybercriminal attack is detected, the security monitor 108 can take a predetermined action based on a calculated risk assessment. More specifically, the user's location, as indicated by the expected use data 112A, public services 112B, or private services 112C can be used in combination with the calendar and the number of current internal network connections of the computing devices 104 to determine if the activity is flagged as a real threat or a false positive. For example, if the user is not at home but the number of outbound connections exceeds the threshold, the security monitor 108 can trigger the predetermined security actions. Additionally, if an electronic calendar shows an event that causes high bandwidth usage but the user is not at home, the security monitor 108 can trigger a predetermined security action. Further, the security monitor 108 can make determinations of a user's location based on user calendar and social media. If the expected use data 112A does not include global positioning satellite (GPS) information, such a determination can help the security monitor 108 to make correlations to determine if the user is at home or not. For example, if the user is at a soccer stadium, then the security monitor 108 can ignore the calendar entry that says that high bandwidth can be caused by the user, and trigger any predetermined security action. Of course, sporting events are merely one example of a social media or calendar entry that can indicate the user's geographic location. Other events can include, but are not limited to, running in a marathon, participating in a public speaking event, and taking a class.

Regarding the origin of the connection recorded in the usage profile 110, the security monitor 108 can determine if a security action is warranted based on whether the connection is known or unknown. For example, if the user normally plays an online game, the usage profile 110 has a record of the IP address of the server for the game. Thus, if one of the computing devices 104 connects to this address, the user is likely playing the game. Because the security monitor 108 can check the usage profile 110 and determine that this is a known connection, the security monitor 108 may not trigger any predetermined security actions. Alternatively, the security monitor 108 can limit the security action to sending an alert.

Additionally, the connection type can be useful in determining whether network activity is malicious or not. For example, the usage profile 110 can indicate that when the user is connected to the game server referenced above, the average upload speed is 120 kilobytes per second (kbps) and the average download speed is 150 kbps. However, if the real-time indicators show that the average upload speed is around 10 kbps and the average download speed is around 200 kbps, the security monitor 108 can determine that a potential cyber attack is occurring. In this way, the security monitor 108 can identify potential attacks based not just based on the bandwidth usage, but also based on what type of connection is consuming the bandwidth. Thus, if the security monitor 108 detects a relatively high upload speed of 150 kbps, the user is not at home, the origin of the connection is unknown, and there is nothing on the calendar to indicate the connection can be legitimate, then the security monitor 108 can identify the connection as a potential threat and execute a predetermined security action.

Further, the number of internal connections between the computing devices 104 can be used to determine whether a cyber attack is occurring. For example, the user may have a LAN party at home, which can increase the network usage. A LAN party can be a gathering of people with computing devices 104, where a local area network connection is established between the computing devices 104. The LAN party can be useful for playing multiplayer video games. As an event such as the LAN party can increase network usage, the real-time indicators of network use can be outside the thresholds of the usage profile 110. However, based on the relatively high number of internal connections between the computing devices 104, the security monitor 108 can determine that the relatively high rate of usage is legitimately caused by the user and therefore avoid a false positive report or action.

Figure 2:
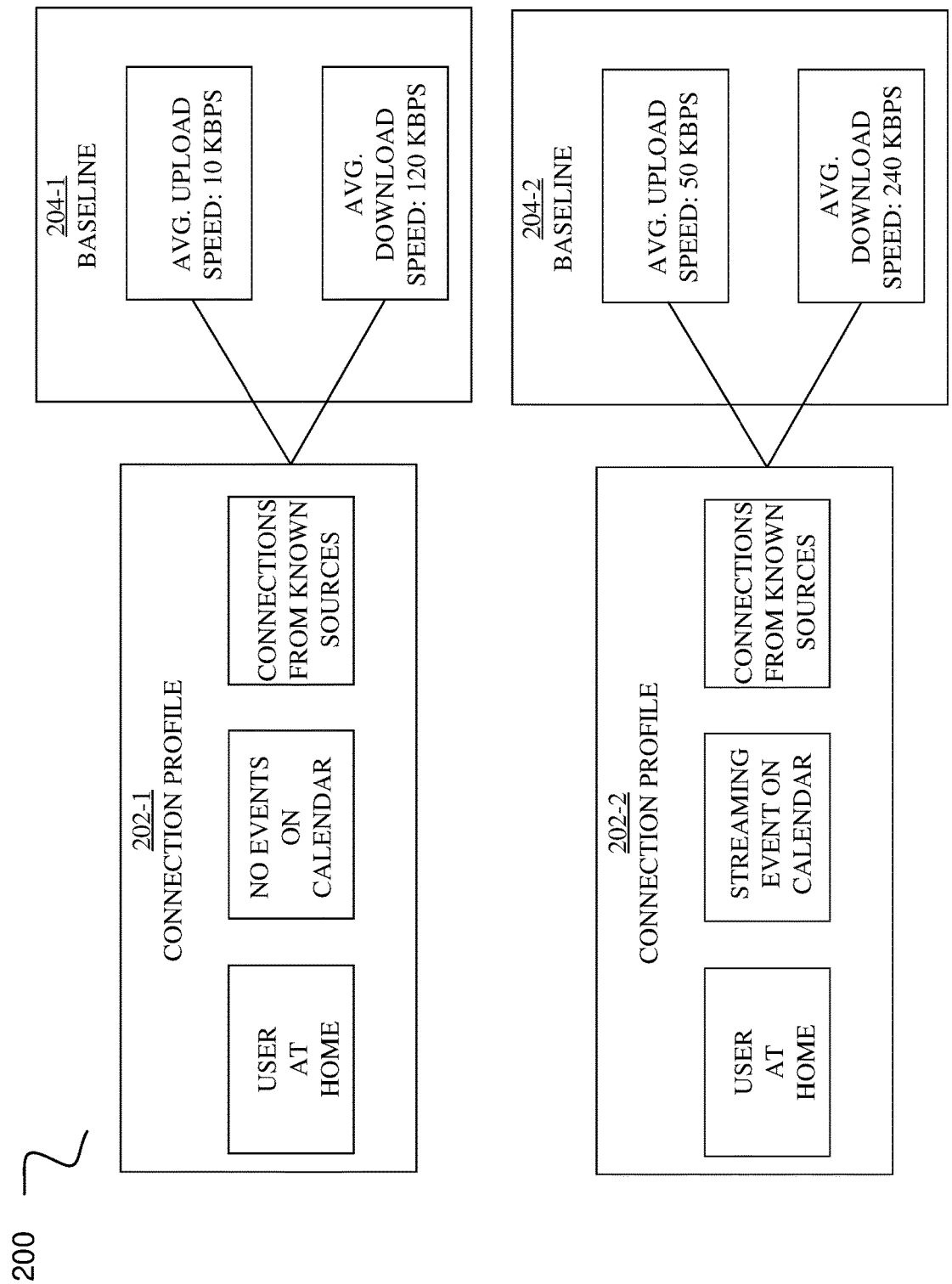
FIG. 2 illustrates a block diagram of an example usage profile, in accordance with embodiments of the present disclosure.

Referring now to FIG. 2, which is a block diagram of an example usage profile 200, in accordance with embodiments of the invention. In some embodiments, the usage profile 200 is consistent with usage profile 110 of FIG. 1. The example usage profile 200 includes connection profiles 202 and baselines 204. The connection profiles 202 include specific parameters of historical connections used by computing devices, such as the computing devices 104 described with respect to FIG. 1. Referring back to FIG. 2, each of the connection profiles 202 is associated with a baseline 204 that indicates the average bandwidth use for upload and download connection types.

For example, the connection profile 202-1 represents a connection made when the user of the computing device 104 is at home, there are no events on the electronic calendars for the user, and the network connections are from known sources. For the connection profile 202-1, the baselines 204-1 include an average upload speed of 10 kbps, and an average download speed of 120 kbps.

In another example, the connection profile 202-2 represents a connection made when the user of the computing device 104 is at home, there is a streaming event scheduled on an electronic calendar for the user, and the network connections are from known sources. For the connection profile 202-2, the baselines 204-2 include an average upload speed of 50 kbps, and an average download speed of 240 kbps.

The usage profile 200 represents a historical pattern for users of the computing devices 104. Accordingly, if one of the computing devices 104 creates a new connection that matches one of the connection profiles 202-1, 202-1, and the bandwidth usage of this new connection exceeds the associated baseline 204-1 or 204-2, the security monitor 108 can take a predetermined security action, such as sending an alert message to a user of the computing devices 104, or shutting down the network connection at the network router 106.

According to embodiments of the present disclosure, the security monitor 108 compares the baselines 204-1, 204-2 to the bandwidth usage of a real-time network connection to calculate a risk assessment value. Based on the risk assessment value, the security monitor 108 takes a predetermined security action. For example, the risk assessment value can range from 0 to 3. A score of 0 can indicate there is no risk. Hence, the security monitor 108 can take no action for a risk assessment value of 0. A score of 1 can indicate there is a low risk. Hence, the security monitor 108 can send an informative-level alert to the user of the computing devices 104 for a risk assessment value of 1. A score of 2 can indicate there is an elevated risk. Hence, the security monitor 108 can send a warning-level alert for a risk assessment value of 2. One example of an informative-level alert is, "Your download speed is currently 10% higher than expected." In contrast, a warning level alert can state, "Your download speed is suspiciously high," and can prompt the user to terminate the network connection. A score of 3 can indicate there is a high risk. Hence, for a risk assessment value of 3, the security monitor 108 can shut down the network router ports used by the at-risk connection. The risk assessment value is not limited to values of 0 to 3. Depending on the implementation of the security monitor 108, risk assessment values can include any number of numerical ranges. Further, risk assessment values can be assigned letter values or semantical values representing different levels of risk, such as none, low, medium, and high, for example.

In some embodiments of the present disclosure, the value scoring for the risk assessment value can be customized by the manipulation of various thresholds, but could include a scoring system where one point is added for each indicator above the baseline. For example, the usage profile 110 can be modified to add a 10% threshold to the average upload and download speeds. In this way, variations in use can be accommodated without triggering a security action. In another example, if the bandwidth usage of the upload and download connection types exceed the baselines 204-1, 204-2, the security monitor 108 adds two points to the risk assessment value (one point for each connection type).

Further, the security monitor 108 can mitigate the risk assessment value for any confirmed security measurement by subtracting a point from the risk assessment value. For example, if the computing device 104 is performing a backup, the security monitor can subtract one point from the risk assessment value. Additionally, if the security monitor 108 identifies any contradictory parameters associated with an active network connection, the security monitor 108 can add 3 points to the risk assessment value. For example, if one of the mobile devices 114, such as a wearable device, indicates the user of the computing device is sleeping, and an active network connection is exceeding the baseline bandwidth usage, this scenario can indicate a contradiction. Hence, the security monitor 108 can assign a high value to the risk assessment value by adding 3 points.

However, if there are contradictory parameters associated with an active network connection and there is an exception, this may indicate an allowable condition. Thus, the security monitor 108 can add 1 point to the risk assessment value instead of 3. For example, if the user is sleeping and an active network connection exceeds the baseline, but one of the computing devices 104 is performing a maintenance operation, this may indicate an allowable condition. Thus, the security monitor 108 can add 1 point to the risk assessment value, which can trigger an informative-level alert instead of a network port shutdown.

Figure 3:
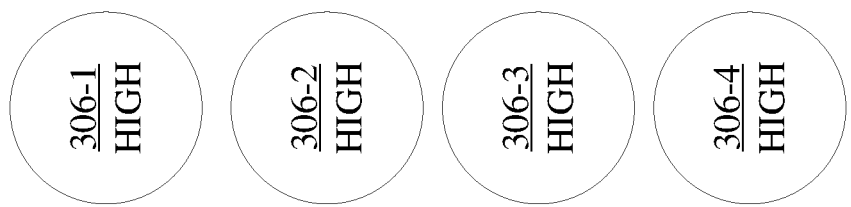
FIG. 3 illustrates a block diagram of a risk assessment value calculation, in accordance with embodiments of the present disclosure.
Figure 3:
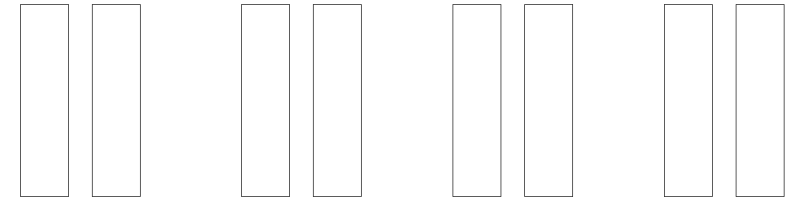
Figure 3:
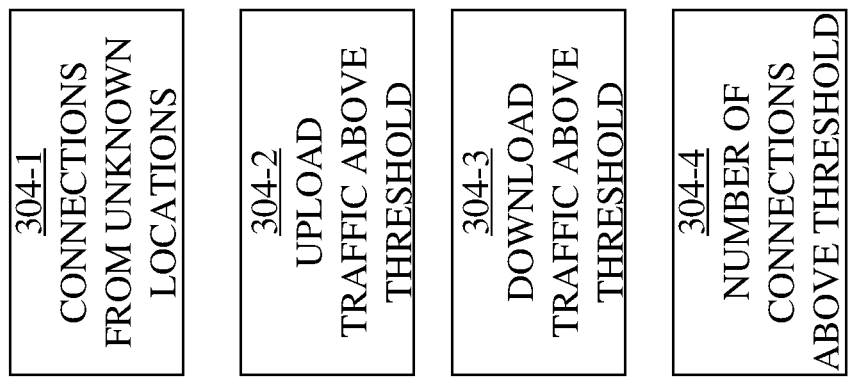
Figure 3:
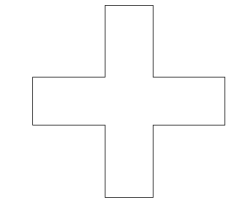
Figure 3:
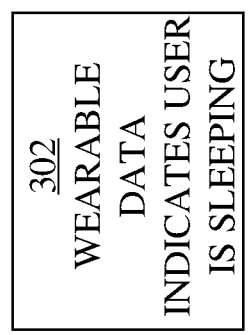

Referring now to FIG. 3, which is a block diagram of a risk assessment value calculation, in accordance with embodiments of the present disclosure. The security monitor 108 can vary how the real-time parameters of a network connection are considered in the calculation of the risk assessment value. For example, each parameter can be evaluated in the range from no risk to high risk and totaled. In this way, the security monitor 108 can evaluate the totaled risk assessment value based on the number of parameters to determine the security action to take, if any. For example, if the security monitor 108 uses 4 parameters, assigning a value up to 3 for each parameter, the total risk assessment value could be as high as 12. Thus, the security monitor 108 may assign the risk level as follows: 0—no risk, 1-4—low risk, 5-8—elevated risk, 9-12—high risk.

In the example shown in FIG. 3, the security monitor 108 can calculate the risk assessment values 306-1 through 306-4 based on expected use data 302, and real-time indicators 304-1 through 304-4. In this example, each of the real-time indicators 304-1 through 304-4 are considered in combination with the expected use data 302 to determine a total of 4 risk assessment values 306-1 through 306-4. The expected use data 302 may be obtained from a mobile device, such as a wearable device. In this example, the expected use data 302 shows that the data from the wearable device indicates the user is sleeping.

The real-time indicator 304-1 indicates that currently active network connections are from unknown locations. As stated previously, a usage profile, such as the usage profile 110 can include a record of all the network connections that computing devices, such as the computing devices 104 create. Accordingly, the security monitor can compare active network connections to this record to determine whether the network connection locations are known or unknown. When the real-time indicator 304-1 is considered in combination with the contradiction of the expected use data 302, the security monitor 108 can calculate a risk assessment value 306-1 of "HIGH." In some embodiments, a risk assessment value of "HIGH" can be represented as the numerical value, 3.

The real-time indicator 304-2 indicates that the upload traffic is above threshold. As stated previously, the usage profile 110 can include a historical record of bandwidth use, which may be associated with days of the week, month, and year, or connection profiles, such as the connection profiles 202-1, 202-2 described with respect to FIG. 2. The security monitor 108 can use this historical record to determine the average upload and download bandwidth use for the associated days or connection profiles. The security monitor 108 can assign these average bandwidth uses to thresholds for comparison to the real-time bandwidth use, or use predetermined variations of historical use for the thresholds. Referring back to FIG. 3, when the real-time indicator 304-2 is considered in combination with the contradiction of the expected use data 302, the security monitor 108 can calculate a risk assessment value 306-2 of "HIGH."

The real-time indicator 304-3 indicates that the download traffic is above threshold. Accordingly, when the real-time indicator 304-3 is considered in combination with the contradiction of the expected use data 302, the security monitor 108 can calculate a risk assessment value 306-3 of "HIGH."

The real-time indicator 304-4 indicates that the number of connections is above threshold. Accordingly, when the real-time indicator 304-4 is considered in combination with the contradiction of the expected use data 302, the security monitor 108 can calculate a risk assessment value 306-4 of "HIGH."

In this example, the total of risk assessment values 306-1 through 306-4 is 12: 3 points for each "HIGH." As stated above, when considering 4 parameters for a total risk assessment value, the risk can be determined accordingly: 0—no risk, 1-4—low risk, 5-8—elevated risk, 9-12—high risk. Because the total risk assessment value is 12, the security monitor 108 can determine that the risk is "HIGH," and shut down the ports of the network connections associated with the real-time indicators 304-1 through 304-4.

Figure 4:
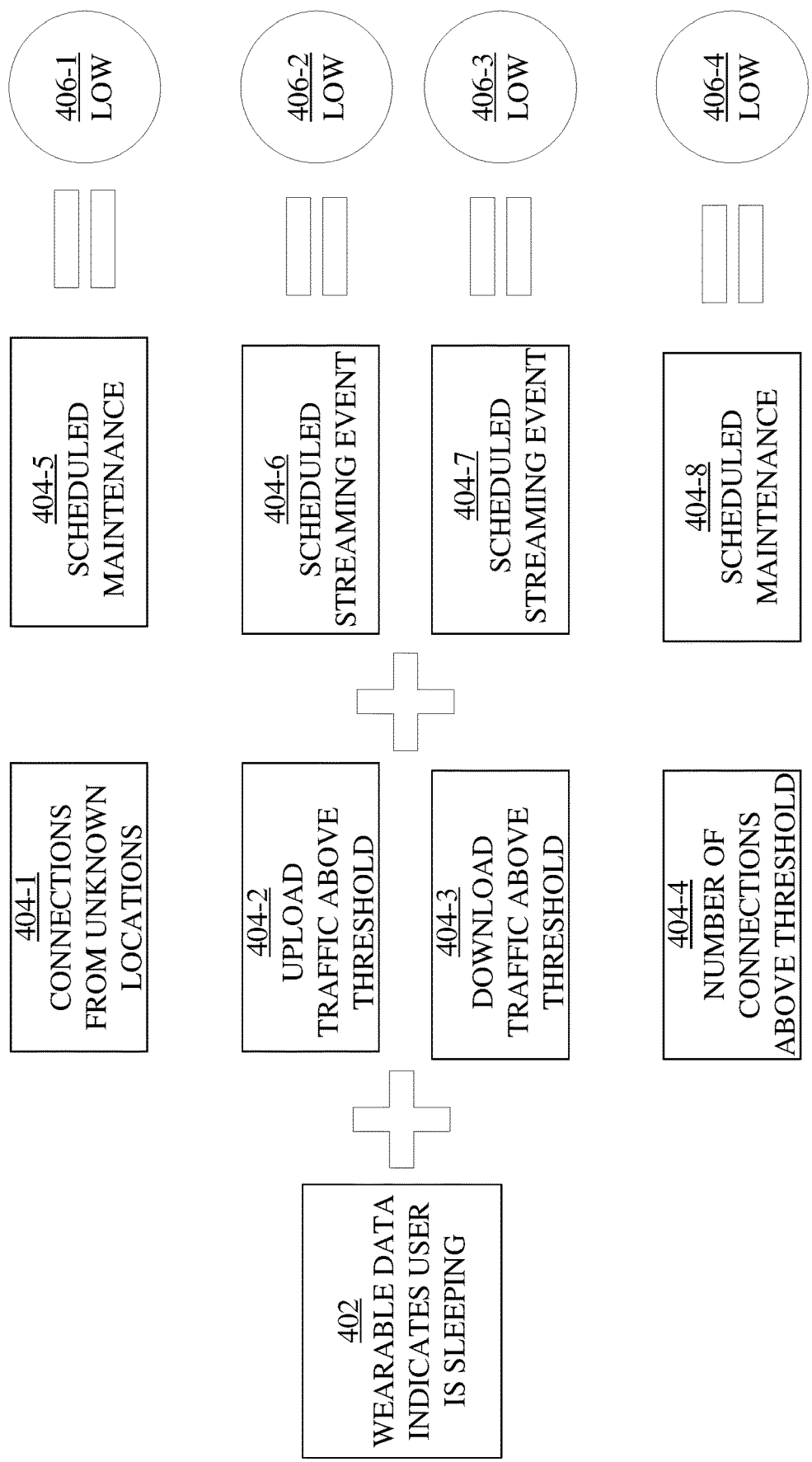
FIG. 4 illustrates a block diagram of a risk assessment value calculation, in accordance with embodiments of the present disclosure.

Referring now to FIG. 4, which is a block diagram of a risk assessment value calculation, in accordance with embodiments of the present disclosure. In the example shown in FIG. 4, the security monitor 108 can calculate risk assessment values 406-1 through 406-4 based on expected use data 402, and real-time indicators 404-1 through 404-8. In this example, each of the real-time indicators 404-1, 404-5; real-time indicators 404-2, 404-6; real-time indicators 404-3, 404-7; and, real-time indicators 404-4, 404-8; are considered in combination with the expected use data 402 to determine a total of 4 risk assessment values 406-1 through 406-4. The expected use data 402 may be obtained from a mobile device, such as a wearable device. In this example, the expected use data 402 shows that the data from the wearable device indicates the user is sleeping.

The real-time indicator 404-1 indicates that currently active network connections are from unknown locations. Additionally, the real-time indicator 404-5 indicates that maintenance is currently scheduled. The security monitor 108 can determine that currently scheduled maintenance is an exception. As stated previously, when a contradiction is indicated along with an exception, the risk assessment value can be determined to be "LOW." Accordingly, when the real-time indicators 404-1, 404-5, are considered in combination with the expected use data 402, the security monitor 108 can calculate a risk assessment value 406-1 of "LOW." In some embodiments, a risk assessment value of "LOW" can be represented as the numerical value, 1.

The real-time indicator 404-2 indicates that the upload traffic is above threshold. Additionally, the real-time indicator 404-6 indicates that a streaming event is currently scheduled. Thus, the security monitor 108 can determine that currently scheduled streaming event is an exception. Accordingly, when the real-time indicators 404-2, 404-6 are considered in combination with the expected use data 402, the security monitor 108 can calculate a risk assessment value 406-2 of "LOW."

The real-time indicator 404-3 indicates that the download traffic is above threshold. Additionally, the real-time indicator 404-7 indicates that a streaming event is currently scheduled. Thus, the security monitor 108 can determine that currently scheduled streaming event is an exception. Accordingly, when the real-time indicators 404-3, 404-7 are considered in combination with the expected use data 402, the security monitor 108 can calculate a risk assessment value 406-3 of "LOW."

The real-time indicator 404-4 indicates that number of active network connections is above threshold. Additionally, the real-time indicator 404-8 indicates that maintenance is currently scheduled. Thus, the security monitor 108 can determine that currently scheduled maintenance is an exception. Accordingly, when the real-time indicators 404-4, 404-8, are considered in combination with the expected use data 402, the security monitor 108 can calculate a risk assessment value 406-4 of "LOW."

In this example, the total of risk assessment values 406-1 through 406-4 is 4: 1 point for each "LOW." As stated above, when considering 4 risk assessment values for a total risk assessment value, the risk can be determined accordingly: 0—no risk, 1-4—low risk, 5-8—elevated risk, 9-12—high risk. Because the total risk assessment value is 4, the security monitor 108 can determine that the risk is "LOW," and send an informative alert for the user regarding the network connections associated with the real-time indicators 404-1 through 404-8.

Figure 5:
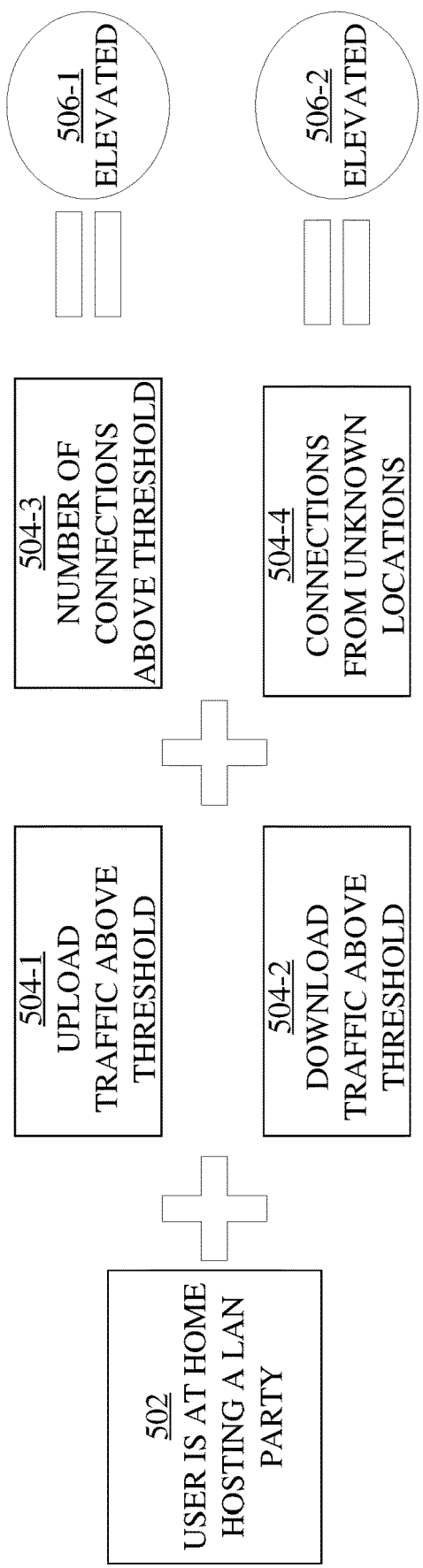
FIG. 5 illustrates a block diagram of a risk assessment value calculation, in accordance with embodiments of the present disclosure.

Referring now to FIG. 5, which is a block diagram of a risk assessment value calculation, in accordance with embodiments of the present disclosure. In the example shown in FIG. 5, the security monitor 108 can calculate risk assessment values 506-1 through 506-2 based on expected use data 502, and real-time indicators 504-1 through 504-4. In this example, each of the real-time indicators 504-1, 504-3; and real-time indicators 504-2, 504-4; are considered in combination with the expected use data 502 to determine a total of 2 risk assessment values 506-1 through 506-2. The expected use data 502 may be obtained from a GPS device and an electronic calendar. In this example, the expected use data 502 shows that the user is at home hosting a LAN party.

The real-time indicator 504-1 indicates that the upload traffic is above threshold. Additionally, the real-time indicator 504-3 indicates that the number of connections is above threshold. Because the user is at home, there is no contradiction between the expected use data 502 and the real-time indicators 504-1, 504-3. However, because there are two real-time indicators 504-1, 504-3 above threshold, when the real-time indicators 504-1, 504-3 are considered in combination with the expected use data 502, the security monitor 108 can calculate a risk assessment value 506-1 of "ELEVATED."

The real-time indicator 504-2 indicates that the download traffic is above threshold. Additionally, the real-time indicator 504-4 indicates that the connections are from unknown locations. Accordingly, when the real-time indicators 504-2, 504-4 are considered in combination with the expected use data 502, the security monitor 108 can calculate a risk assessment value 506-2 of "ELEVATED."

In this example, the total of risk assessment values 506-1 through 506-2 is 4: 2 points for each "ELEVATED." When considering 2 risk assessment values for a total risk assessment value, the risk can be determined accordingly: 0—no risk, 1-2—low risk, 3-4—elevated risk, 5-6—high risk. Because the total risk assessment value is 4, the security monitor 108 can determine that the risk is "ELEVATED," and send a warning alert for the user regarding the network connections associated with the real-time indicators 504-1 through 504-4. The warning alert can present an indication to the user that the risk of a cyber attack is higher than the risk associated with an informative alert.

Figure 6:
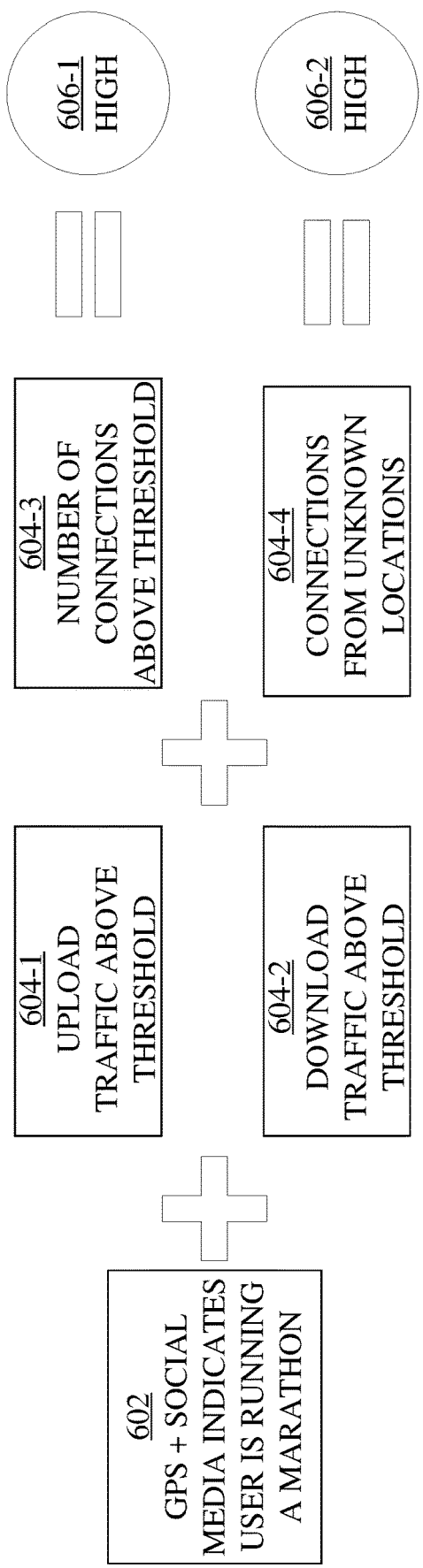
FIG. 6 illustrates a block diagram of a risk assessment value calculation, in accordance with embodiments of the present disclosure.

Referring now to FIG. 6, which is a block diagram of a risk assessment value calculation, in accordance with embodiments of the present disclosure. In the example shown in FIG. 6, the security monitor 108 can calculate risk assessment values 606-1 through 606-2 based on expected use data 602, and real-time indicators 604-1 through 604-4. In this example, each of the real-time indicators 604-1, 604-3; and real-time indicators 604-2, 604-4; are considered in combination with the expected use data 602 to determine a total of 2 risk assessment values 606-1 through 606-2. The expected use data 602 may be obtained from a GPS device and a social media posting by the user. In this example, the expected use data 602 shows that the user is running a marathon.

The real-time indicator 604-1 indicates that the upload traffic is above threshold. Additionally, the real-time indicator 604-3 indicates that the number of connections is above threshold. Because the user is not at home, there is a contradiction between the expected use data 602 and the real-time indicators 604-1, 604-3. Accordingly, when the real-time indicators 604-1, 604-3 are considered in combination with the expected use data 602, the security monitor 108 can calculate a risk assessment value 606-1 of "HIGH."

The real-time indicator 604-2 indicates that the download traffic is above threshold. Additionally, the real-time indicator 604-4 indicates that the connections are from unknown locations. Accordingly, when the real-time indicators 604-2, 604-4 are considered in combination with the expected use data 602, the security monitor 108 can calculate a risk assessment value 606-2 of "HIGH."

In this example, the total of risk assessment values 606-1 through 606-2 is 6: 3 points for each "HIGH." When considering 2 risk assessment values for a total risk assessment value, the risk can be determined accordingly: 0—no risk, 1-2—low risk, 3-4—elevated risk, 5-6—high risk. Because the total risk assessment value is 6, the security monitor 108 can determine that the risk is "HIGH," and shut down the ports for the network connections associated with the real-time indicators 604-1 through 604-4.

Figure 7:
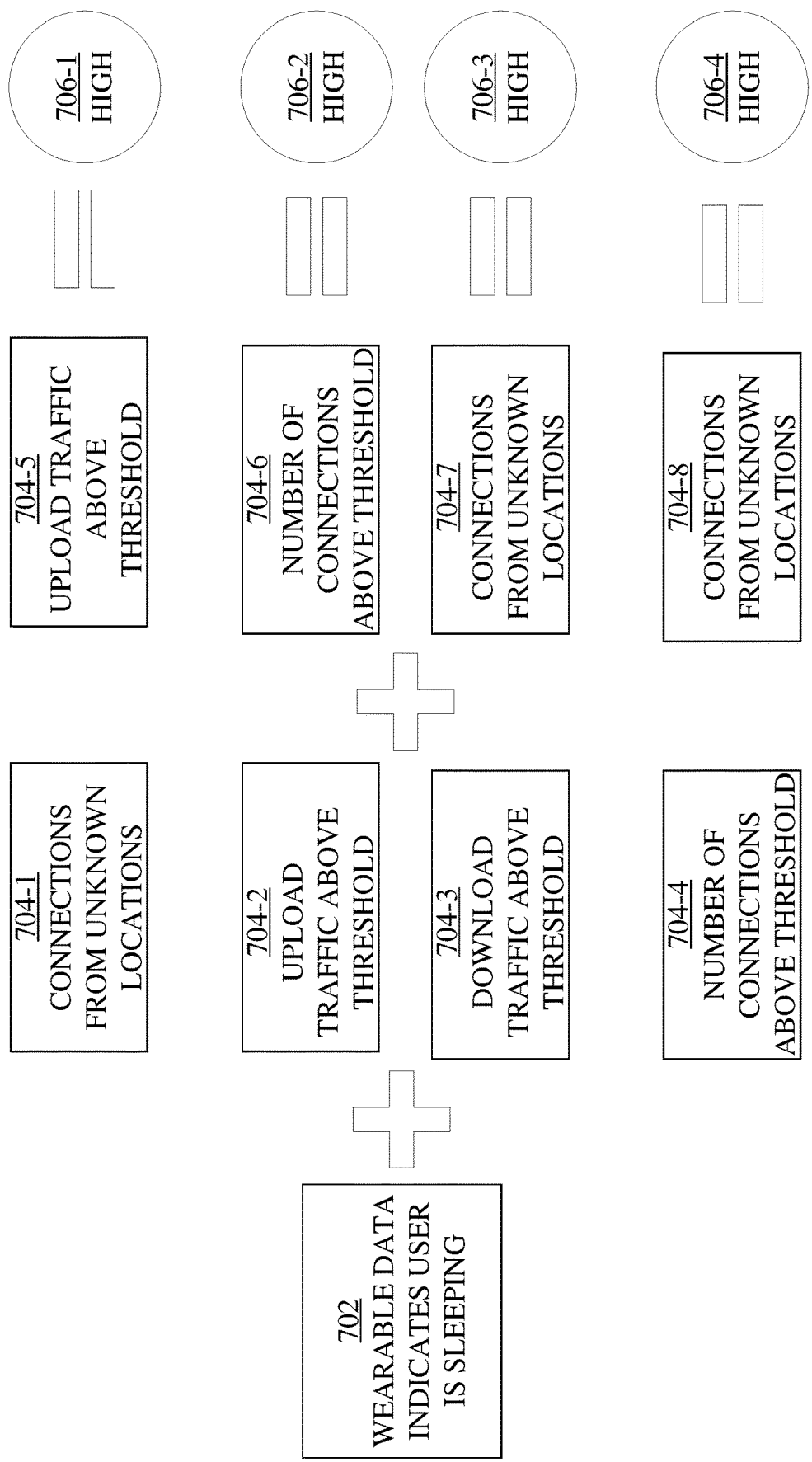
FIG. 7 illustrates a block diagram of a risk assessment value calculation, in accordance with embodiments of the present disclosure.

Referring now to FIG. 7, which is a block diagram of a risk assessment value calculation, in accordance with embodiments of the present disclosure. In the example shown in FIG. 7, the security monitor 108 can calculate risk assessment values 706-1 through 706-4 based on expected use data 702, and real-time indicators 704-1 through 704-8. In this example, each of the real-time indicators 704-1, 704-5; real-time indicators 704-2, 704-6; real-time indicators 704-3, 704-7; and, real-time indicators 704-4, 704-8; are considered in combination with the expected use data 702 to determine a total of 4 risk assessment values 706-1 through 706-4. In this example, the expected use data 702 shows that the data from the wearable device indicates the user is sleeping.

The real-time indicator 704-1 indicates that currently active network connections are from unknown locations. Additionally, the real-time indicator 704-5 indicates that the upload traffic is above threshold. Accordingly, when the real-time indicators 704-1, 704-5, are considered in combination with the contradiction of the expected use data 702, the security monitor 108 can calculate a risk assessment value 706-1 of "HIGH."

The real-time indicator 704-2 indicates that the upload traffic is above threshold. Additionally, the real-time indicator 704-6 indicates that the number of connections is above threshold. Accordingly, when the real-time indicators 704-2, 704-6 are considered in combination with the contradiction of the expected use data 702, the security monitor 108 can calculate a risk assessment value 706-2 of "HIGH."

The real-time indicator 704-3 indicates that the download traffic is above threshold. Additionally, the real-time indicator 704-7 indicates that the connections are from unknown locations. Accordingly, when the real-time indicators 704-3, 704-7 are considered in combination with the contradiction of the expected use data 702, the security monitor 108 can calculate a risk assessment value 706-3 of "HIGH."

The real-time indicator 704-4 indicates that number of active network connections is above threshold. Additionally, the real-time indicator 704-8 indicates that the connections are from unknown locations. Accordingly, when the real-time indicators 704-4, 704-8, are considered in combination with the contradiction of the expected use data 702, the security monitor 108 can calculate a risk assessment value 706-4 of "HIGH."

In this example, the total of risk assessment values 706-1 through 706-4 is 12: 3 points for each "HIGH." As stated above, when considering 4 risk assessment values for a total risk assessment value, the risk can be determined accordingly: 0—no risk, 1-4—low risk, 5-8—elevated risk, 9-12—high risk. Because the total risk assessment value is 12, the security monitor 108 can determine that the risk is "HIGH," and shut down the ports for the network connections associated with the real-time indicators 704-1 through 704-8.

Figure 8:
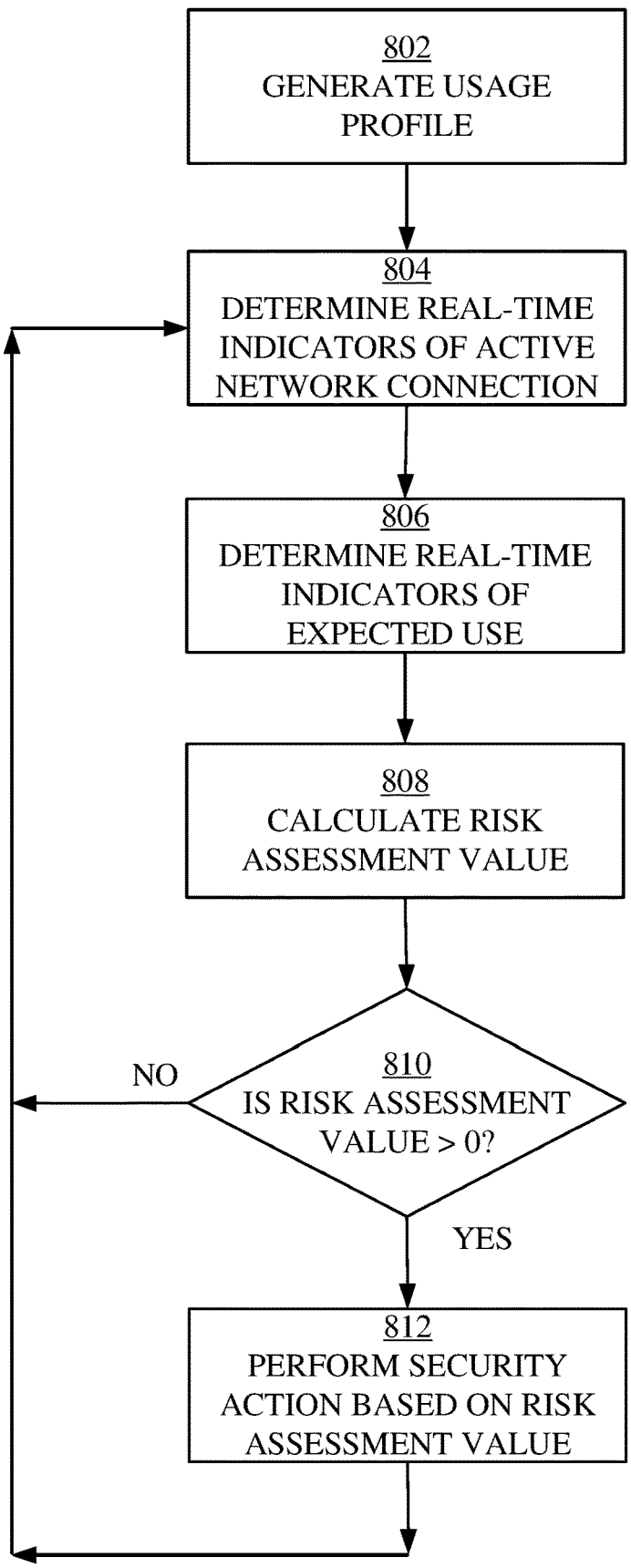
FIG. 8 illustrates a flowchart of a method for preventing network attacks, in accordance with embodiments of the present disclosure.

Referring now to FIG. 8, illustrated is a flowchart of an example method 800 for preventing network attacks, in accordance with embodiments of the present disclosure. The method 800 can be performed by a security monitor, such as the security monitor 108 described with respect to FIG. 1. Referring back to FIG. 8, at block 802, the security monitor 108 can generate a usage profile, such as the usage profile 110. The security monitor 108 can generate the usage profile by determining when network connections are active, and recording the associated bandwidth use, connection types, number of connections, and the location of the user. In some embodiments, the usage profile 110 can include connection profiles and baselines, such as the connection profiles 202-1, 202-2, and baselines 204-1, 204-2.

At block 804, the security monitor 108 can determine real-time indicators of active network connections. The real-time indicators can represent actual usage of the active network connections, such as the bandwidth per connection type and the number of connections.

At block 806, the security monitor 108 can determine real-time indicators of expected use. The real-time indicators of expected use can include the location of the user, whether the user is awake or asleep, and scheduled streaming events. The security monitor 108 can determine the real-time indicators of expected use by accessing expected use data, public services, and private services, such as the expected use data 112A, public services 112B, and private services 112C, described with respect to FIG. 1.

Referring back to FIG. 8, at block 808, the security monitor 108 can calculate a risk assessment value for the active network connections. The security monitor 108 can calculate the risk assessment value based on the real-time indicators of the active network connections and the real-time indicators of expected use, as described with respect to FIGS. 3-7. As stated previously, the risk assessment value can be a total of multiple risk assessment values that are calculated based on pre-determined combinations of real-time indicators. Further, the risk assessment value can be determined using numeric values.

Referring back to FIG. 8, at block 810, the security monitor 108 can determine whether the risk assessment value is greater than 0. A risk assessment value of 0 can indicate there is no risk associated with the active network connections. Accordingly, if the risk assessment value is not greater than 0, control of the method 800 can flow back to block 804. However, if the risk assessment value is greater than 0, control the method 800 can flow to block 812.

At block 812, the security monitor 108 can perform a security action based on the calculated risk assessment value. As stated previously, if the risk assessment value is low, e.g., a numeric value of 1, the security monitor 108 can send an informative alert to the user. If the risk assessment value is elevated, e.g., a numeric value of 2, the security monitor 108 can send a warning alert to the user. If the risk assessment value is high, e.g., a numeric value of 3, the security monitor 108 can shut down the ports for the network connections associated with the risky real-time indicators. Additionally, in some embodiments of the present disclosure, the informative and warning alerts can include a selectable option for the user to take an action, e.g., dropping the network connections at issue, or shutting down the associated ports.

The security monitor 108 can be a cognitive system that records user connectivity data to create the usage profile 110 based on usage patterns. The usage patterns may change on specific dates. Accordingly, the security monitor 108 can correlate the profile data, the usage patterns, and real-time indicators to tune the predictions. This correlation can be used to calculate risk assessment values, which can be used to determine security actions to take. Advantageously, the security monitor 108 can calculate a risk assessment value based on the correlation of the usage profile and a number of real-time indicators of expected use, which can be determined from wearables, smartphone profiles, user calendars, scheduled maintenance activities, user location, user events gleaned from social media, and the source, amount, and type of network connectivity. In this way, the security monitor 108 can intelligently identify threats by identifying uncommon usage behavior variations. Additionally, the risk levels construction described can help to determine more intelligently which action to take to manage the variations, from a simple note to the user to more specific and strong measures according to risk level.

Figure 9:
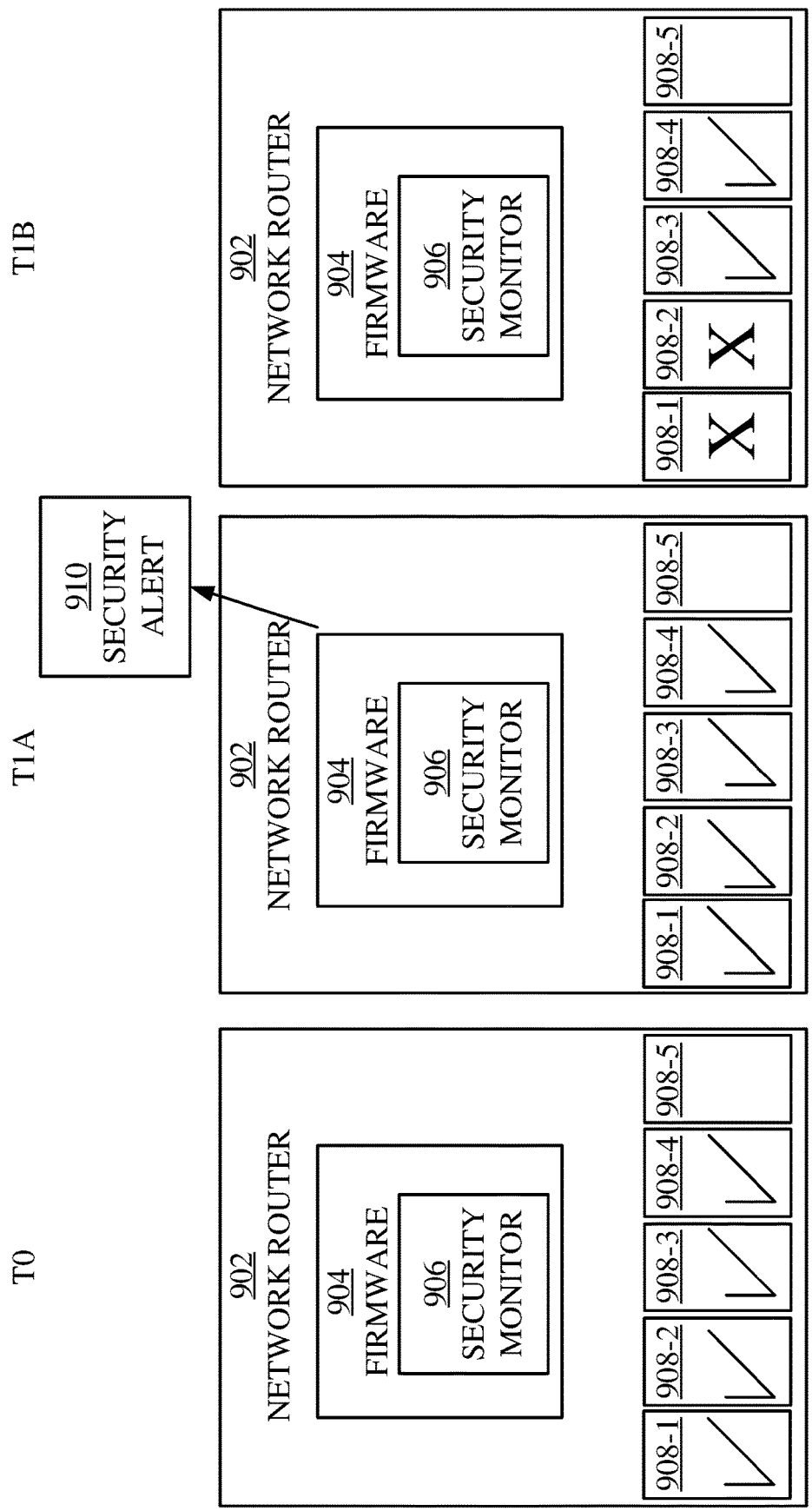
FIG. 9 illustrates a block diagram of a system for preventing network attacks, in accordance with embodiments of the present disclosure.

Referring now to FIG. 9, which is a block diagram of a system timeline for preventing network attacks, in accordance with embodiments of the present disclosure. The system timeline includes a network router 902 at various stages of operation, times T0, T1A, and T1B.

The network router 902 includes firmware 904 and ports 908-1 through 908-5. The firmware 904 can be computer processing instructions that operate the network router 902. In some embodiments of the present disclosure, the firmware 904 includes a security monitor 906. The security monitor 906 is similar to the security monitor 108 described with reference to FIGS. 1-8.

Referring back to FIG. 9, the ports 908-1 through 908-5 can be network ports that connect to a network, such as the network 102 described with reference to FIG. 1. Further, the ports 908-1 through 908-5 can connect to a computing device, such as the computing devices 104 described with respect to FIG. 1. By connecting to the network 102 and computing devices 104, the network router 906 can provide network connectivity between the network 102 and the computing devices 104.

As shown, at time T0, ports 908-1 through 908-4 include check marks. The check marks can indicate that the ports 908-1 through 908-4 are serving open connections between the network 102 and the computing devices 104. The lack of a check mark in port 908-5 can indicate that the port is open but not currently in use. According to embodiments of the present disclosure, at time T0, the security monitory 906 can detect a potential network attack by calculating risk assessment values for the current connections over ports 908-1 to 908-2.

If the risk assessment value indicates a low or elevated risk, at time T1A, the security monitor 906 can send an alert 910 to a user of the computing device 104. The alert 910 can be an informative alert or a warning alert.

If the risk assessment value indicates a high risk, at time T1B, the security monitor 906 can shut down ports 908-1, 908-2. The "X" symbol in ports 908-1, 908-2 indicates that the ports are shut down, and no longer capable of hosting network connections.

Figure 10:
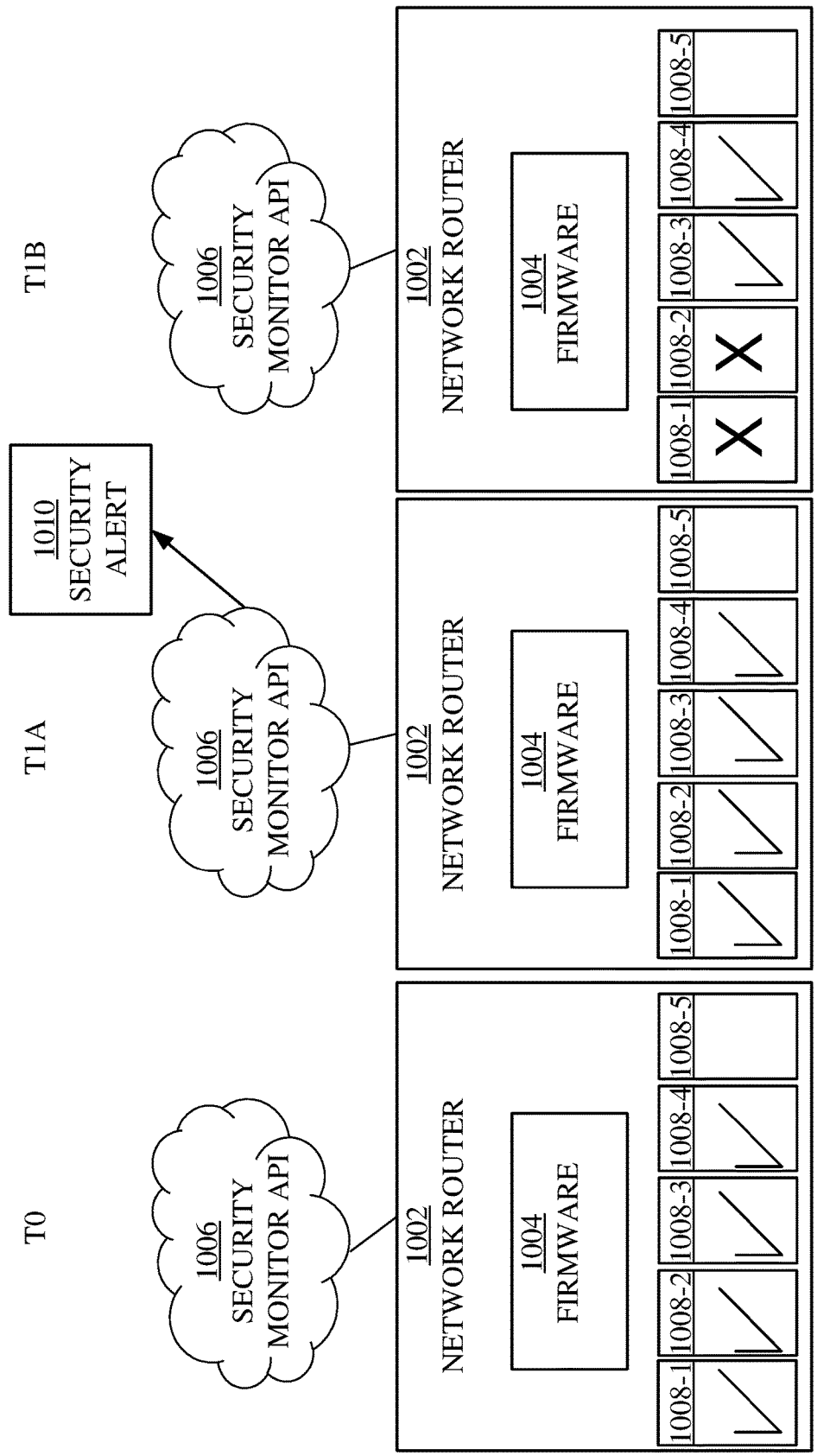
FIG. 10 illustrates a block diagram of a system for preventing network attacks, in accordance with embodiments of the present disclosure.

Referring now to FIG. 10, which is a block diagram of a system timeline for preventing network attacks, in accordance with embodiments of the present disclosure. The system timeline includes a network router 1002 at various stages of operation, times T0, T1A, and T1B.

The network router 1002 includes firmware 1004 and ports 1008-1 through 1008-5. The firmware 1004 can be computer processing instructions that operate the network router 1002. Some embodiments of the present disclosure can include a security monitor API 1006. The security monitor API 1006 can be an interface to the network router 1002, that enables a security monitor implemented as a cloud service to access the data used to perform the techniques of the security monitor 108 described with reference to FIGS. 1-8.

Referring back to FIG. 10, the ports 1008-1 through 1008-5 can be network ports that connect to a network, such as the network 102 described with reference to FIG. 1. Further, the ports 1008-1 through 1008-5 can connect to a computing device, such as the computing devices 104 described with respect to FIG. 1. By connecting to the network 102 and computing devices 104, the network router 1006 can provide network connectivity between the network 102 and the computing devices 104.

As shown, at time T0, ports 1008-1 through 1008-4 include check marks. The check marks can indicate that the ports 1008-1 through 1008-4 are serving open connections between the network 102 and the computing devices 104. The lack of a check mark in port 1008-5 can indicate that the port is open but not currently in use. According to embodiments of the present disclosure, at time T0, the security monitory 1006 can detect a potential network attack by calculating risk assessment values for the current connections over ports 1008-1 to 1008-2.

If the risk assessment value indicates a low or elevated risk, at time T1A, the security monitor 1006 can send an alert 1010 to a user of the computing device 104. The alert 1010 can be an informative alert or a warning alert.

If the risk assessment value indicates a high risk, at time T1B, the security monitor 1006 can shut down ports 1008-1, 1008-2. The "X" symbol in ports 1008-1, 1008-2 indicates that the ports are shut down, and no longer capable of hosting network connections.

Figure 11:
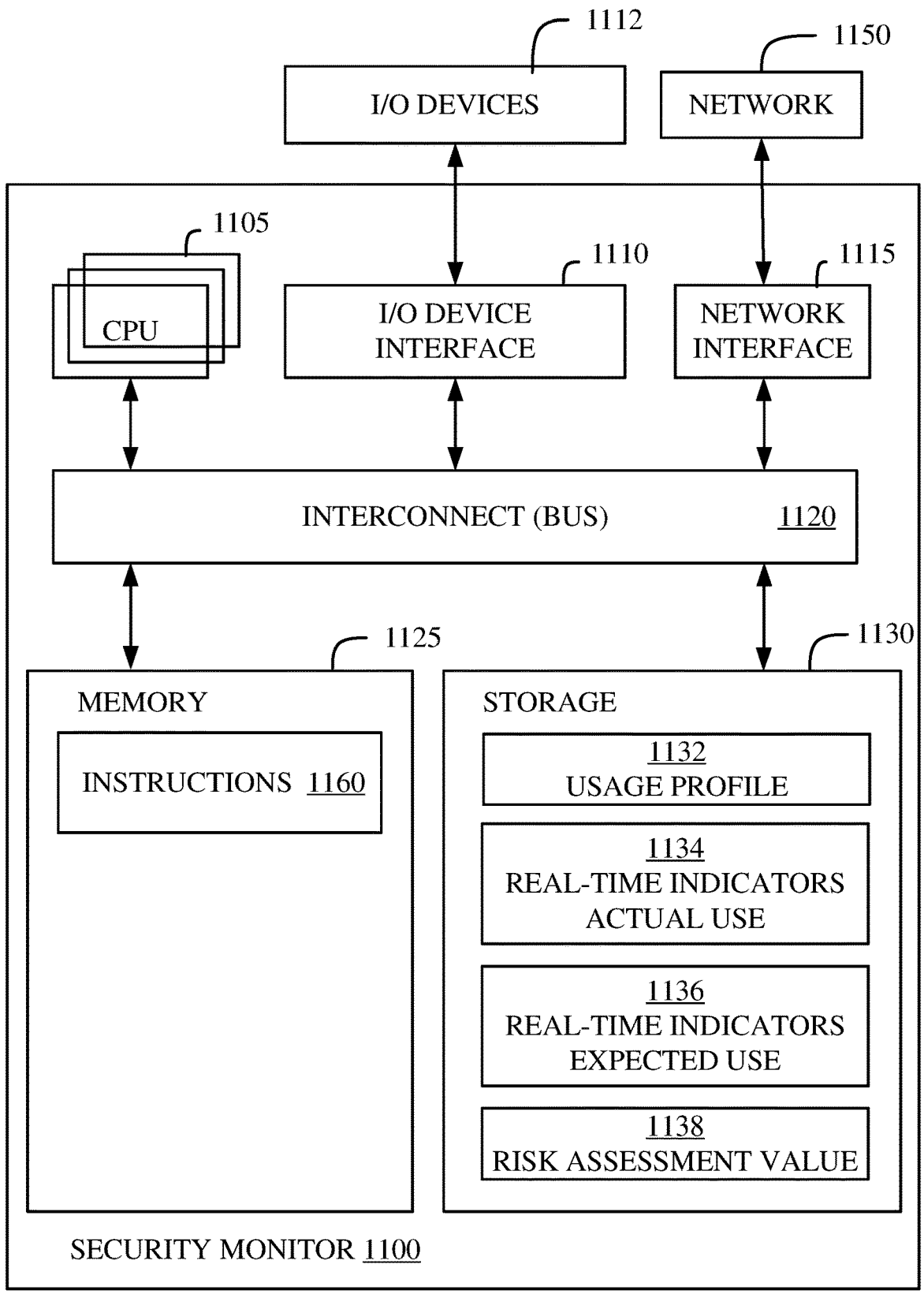
FIG. 11 illustrates a block diagram of an example security monitor, in accordance with embodiments of the present disclosure.

Referring now to FIG. 11, illustrated is a block diagram of an example security monitor 1100, in accordance with embodiments of the present disclosure. In some embodiments, security monitor 1100 is consistent with security monitor 108 of FIG. 1 and/or security monitor 906 of FIG. 9. In various embodiments, the security monitor 1100 can perform the method described in FIG. 8 and/or the functionality discussed in FIGS. 1-7, 9, and 10. In some embodiments, the security monitor 1100 provides instructions for the aforementioned methods and/or functionalities to a client machine such that the client machine executes the method, or a portion of the method, based on the instructions provided by the security monitor 1100. In some embodiments, the security monitor 1100 comprises software executing on hardware incorporated into a plurality of devices.

The security monitor 1100 includes a memory 1125, storage 1130, an interconnect (e.g., BUS) 1120, one or more CPUs 1105 (also referred to as processors 1105 herein), an I/O device interface 1110, I/O devices 1112, and a network interface 1115.

Each CPU 1105 retrieves and executes programming instructions stored in the memory 1125 or the storage 1130. The interconnect 1120 is used to move data, such as programming instructions, between the CPUs 1105, I/O device interface 1110, storage 1130, network interface 1115, and memory 1125. The interconnect 1120 can be implemented using one or more busses. The CPUs 1105 can be a single CPU, multiple CPUs, or a single CPU having multiple processing cores in various embodiments. In some embodiments, a CPU 1105 can be a digital signal processor (DSP). In some embodiments, CPU 1105 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1125 is generally included to be representative of a random access memory (e.g., static random access memory (SRAM), dynamic random access memory (DRAM), or Flash). The storage 1130 is generally included to be representative of a non-volatile memory, such as a hard disk drive, solid state device (SSD), removable memory cards, optical storage, and/or flash memory devices. Additionally, the storage 1130 can include storage area-network (SAN) devices, the cloud, or other devices connected to the security monitor 1100 via the I/P device interface 1110 or a network 1150 via the network interface 1115.

In some embodiments, the memory 1125 stores instructions 1160 and the storage 1130 stores a usage profile 1132, real-time indicators actual use 1134, real-time indicators expected use 1136, and risk assessment value 1138. However, in various embodiments, the instructions 1160, usage profile 1132, real-time indicators actual use 1134, real-time indicators expected use 1136, and risk assessment value 1138 are stored partially in memory 1125 and partially in storage 1130, or they are stored entirely in memory 1125 or entirely in storage 1130, or they are accessed over a network 1150 via the network interface 1115.

Instructions 1160 can be processor-executable instructions for performing any portion of, or all, any of the method of FIG. 8 and/or any of the functionality discussed in FIGS. 1-7, 9, and 10.

The usage profile 1132 can include historical data about network use, such as bandwidth, connection types, number of connections, and the like. The real-time indicators actual use 1134 can include real-time data about the use of active network connections. The real-time indicators actual use 1134 can thus include bandwidth, connection types, number of connections, and the like. The real-time indicators expected use 1136 can include real-time data that is relevant to the expectations of how network connections are used. The real-time indicators expected use 1136 can include data such as GPS location, information on a personal electronic calendar, information on an office electronic calendar, social media posts, whether a user is awake or sleeping, and the like. Additionally, the security monitor 1100 can calculate the risk assessment value 1138 based on the real-time indicators actual use 1134, and the real-time indicators expected use 1136. The risk assessment value 1138 can indicate a low, elevated, or high level of risk of a network attack.

In various embodiments, the I/O devices 1112 include an interface capable of presenting information and receiving input. For example, I/O devices 1112 can present information to a user interacting with security monitor 1100 and receive input from the user.

The security monitor 1100 is connected to the network 1150 via the network interface 1115. Network 1150 can comprise a physical, wireless, cellular, or different network.

In some embodiments, the security monitor 1100 can be a multi-user mainframe computer system, a single-user system, or a server computer or similar device that has little or no direct user interface but receives requests from other computer systems (clients). Further, in some embodiments, the security monitor 1100 can be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary security monitor 1100. In some embodiments, however, individual components can have greater or lesser complexity than as represented in FIG. 11, components other than or in addition to those shown in FIG. 11 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
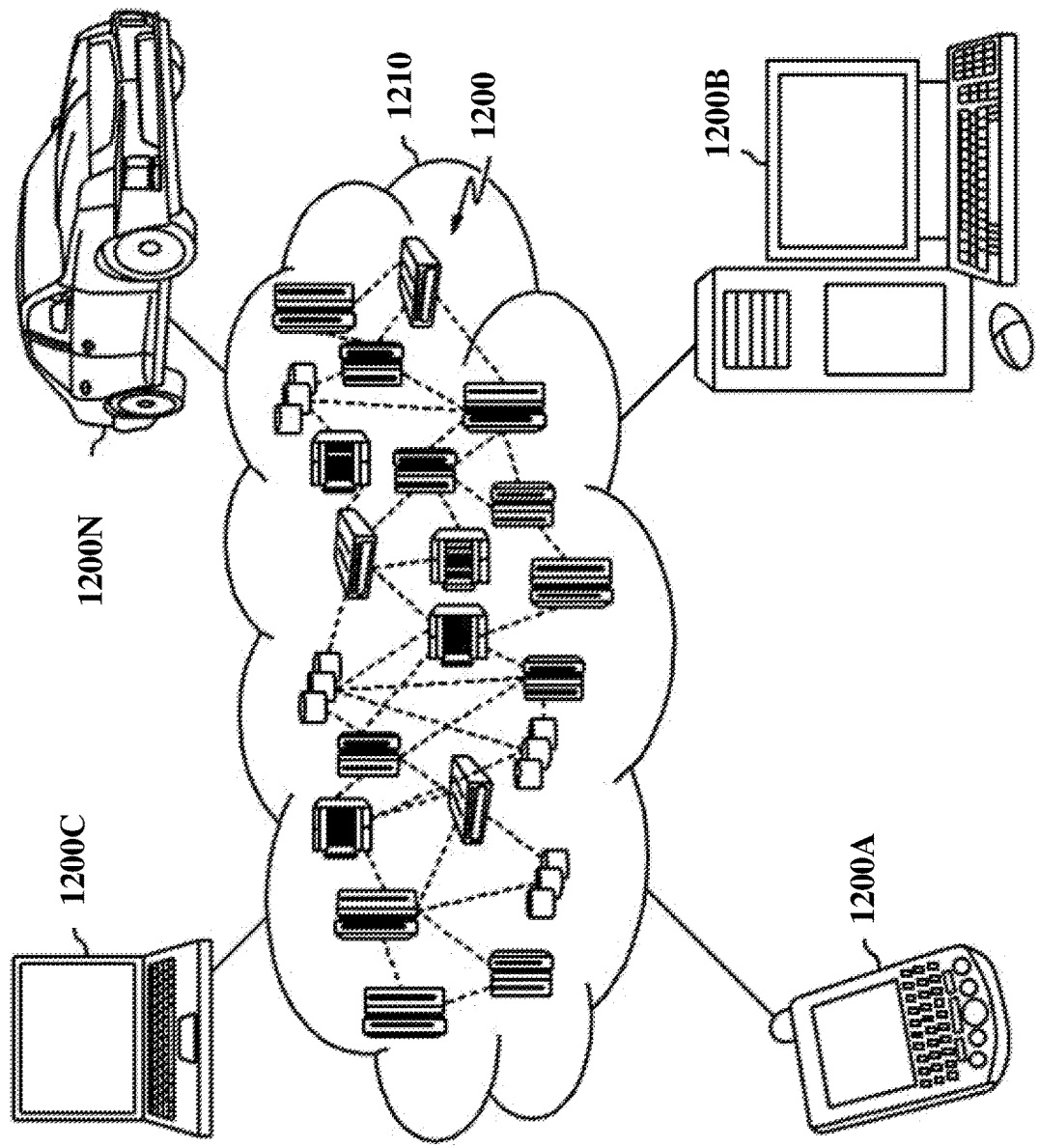
FIG. 12 depicts a cloud computing environment, according to some embodiments of the present disclosure.

Referring now to FIG. 12, which depicts a cloud computing environment 1210, according to some embodiments of the present disclosure. As shown, cloud computing environment 1210 includes one or more cloud computing nodes 1200. The cloud computing nodes 1200 can perform the method described in FIG. 8 and/or the functionality discussed in FIGS. 1-7, 9, and 12. Additionally, cloud computing nodes 1200 can communicate with local computing devices used by cloud consumers, such as, for example, personal digital assistant (PDA) or cellular telephone 1200A, desktop computer 1200B, laptop computer 1200C, and/or automobile computer system 1200N. Further, the cloud computing nodes 1200 can communicate with one another. The cloud computing nodes 1200 can also be grouped (not shown) physically or virtually, in one or more networks, such as Private, Community, Public, or Hybrid clouds as described hereinabove, or a combination thereof. This allows cloud computing environment 1210 to offer infrastructure, platforms and/or software as services for which a cloud consumer does not need to maintain resources on a local computing device. It is understood that the types of computing devices 1200A-N shown in FIG. 12 are intended to be illustrative only and that computing nodes 1200 and cloud computing environment 1210 can communicate with any type of computerized device over any type of network and/or network addressable connection (e.g., using a web browser).

Figure 13:
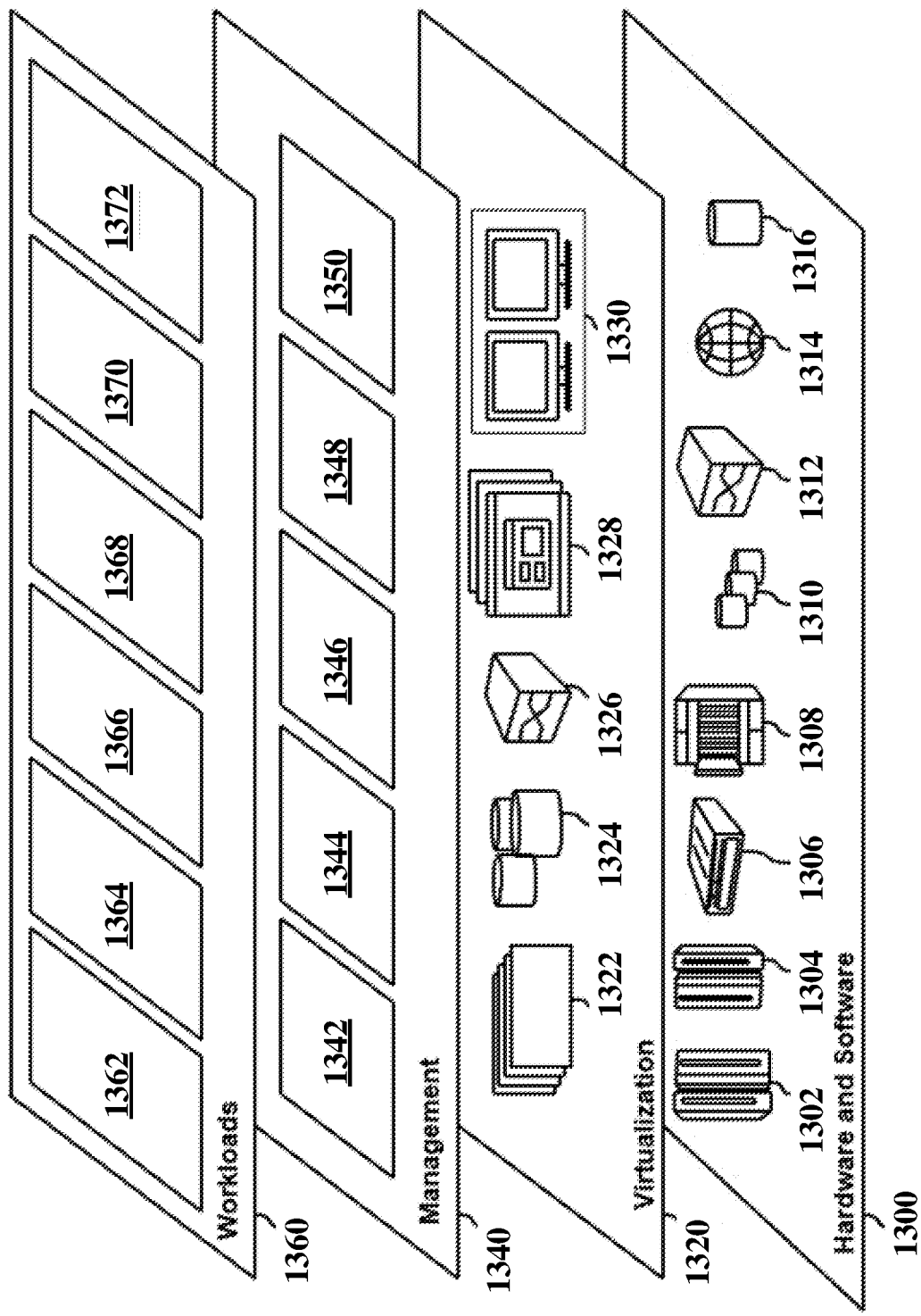
FIG. 13 depicts abstraction model layers, according to some embodiments of the present disclosure.

Referring now to FIG. 13, which depicts abstraction model layers provided by cloud computing environment 1210 (FIG. 12), according to some embodiments of the present disclosure. It should be understood in advance that the components, layers, and functions shown in FIG. 13 are intended to be illustrative only and embodiments of the disclosure are not limited thereto. As depicted below, the following layers and corresponding functions are provided.

Hardware and software layer 1300 includes hardware and software components. Examples of hardware components include: mainframes 1302; RISC (Reduced Instruction Set Computer) architecture based servers 1304; servers 1306; blade servers 1308; storage devices 1310; and networks and networking components 1312. In some embodiments, software components include network application server software 1314 and database software 1316.

Virtualization layer 1320 provides an abstraction layer from which the following examples of virtual entities can be provided: virtual servers 1322; virtual storage 1324; virtual networks 1326, including virtual private networks; virtual applications and operating systems 1328; and virtual clients 1330.

In one example, management layer 1340 can provide the functions described below. Resource provisioning 1342 provides dynamic procurement of computing resources and other resources that are utilized to perform tasks within the cloud computing environment. Metering and Pricing 1344 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1346 provides access to the cloud computing environment for consumers and system administrators. Service level management 1348 provides cloud computing resource allocation and management such that required service levels are met. Service level management 1348 can allocate suitable processing power and memory to process static sensor data. Service Level Agreement (SLA) planning and fulfillment 1350 provide pre-arrangement for, and procurement of, cloud computing resources for which a future requirement is anticipated in accordance with an SLA.

Workloads layer 1360 provides examples of functionality for which the cloud computing environment can be utilized. Examples of workloads and functions which can be provided from this layer include: mapping and navigation 1362; software development and lifecycle management 1364; virtual classroom education delivery 1366; data analytics processing 1368; transaction processing 1370; and security monitor 1372.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising: generating a usage profile for a computing device that accesses a network; determining a plurality of actual use real-time indicators for a network connection on the network; determining a plurality of expected use real-time indicators for the network connection; calculating a risk assessment value for the network connection by:
   comparing the actual use real-time indicators to the expected use real-time indicators; and
   increasing the risk assessment value when one of the actual use real-time indicators represents a greater use than a corresponding one of the expected use real-time indicators; and
   performing a security action for the network connection based on the calculated risk assessment value by:
   sending an informative alert to a user of the computing device based on the risk assessment value comprising a relatively low level of network attack risk; and
   sending a warning alert to the user of the computing device based on the risk assessment value comprising a relatively elevated level of the network attack risk; and
   dropping the network connection based on the risk assessment value comprising a relatively high value of the network attack risk.

2. The method of claim 1, wherein the usage profile comprises a connection profile and an associated baseline, wherein the connection profile comprises:
   a location of the user of the computing device;
   an indicator that the user is participating in an event; and
   an indicator whether a plurality of currently open network connections are from known connection sources.

3. The method of claim 2, wherein the baseline comprises:
   an average upload bandwidth rate; and
   an average download bandwidth rate.

4. A computer program product comprising program instructions stored on a non-transitory computer readable storage medium, wherein the computer readable storage medium is not a transitory signal per se, the program instructions executable by a processor to cause the processor to perform a method comprising:
   generating a usage profile for a computing device that accesses a network:
   determining a plurality of actual use real-time indicators for a network connection on the network;
   determining a plurality of expected use real-time indicators for the network connection;
   calculating a risk assessment value for the network connection by: comparing the actual use real-time indicators to the expected use real-time indicators; and
   increasing the risk assessment value when one of the actual use real-time indicators represents a greater use than a corresponding one of the expected use real-time indicators; and
   performing a security action for the network connection based on the calculated risk assessment value by sending a warning alert to a user of the computing device based on the risk assessment value comprising a relatively low level of the network attack risk; and
   dropping the network connection based on the risk assessment value comprising a relatively high value of network attack risk.

5. The computer program product of claim 4, wherein performing the security action further comprises: sending an informative alert to the user of the computing device based on the risk assessment value comprising a relatively elevated level of the network attack risk.

6. The computer program product of claim 4, wherein the usage profile comprises a connection profile and an associated baseline, wherein the connection profile comprises:
   a location of a user of the computing device;
   an indicator that the user is participating in an event; and
   an indicator whether a plurality of currently open network connections are from known connection sources.

7. The computer program product of claim 6, wherein the baseline comprises:
   an average upload bandwidth rate; and
   an average download bandwidth rate.

8. A system comprising: a computer processing circuit; and a non-transitory computer-readable storage medium storing instructions, which, when executed by the computer processing circuit, are configured to cause the computer processing circuit to perform a method comprising: generating a usage profile for a computing device that accesses a network;
   determining a plurality of actual use real-time indicators for a network connection on the network;
   determining a plurality of expected use real-time indicators for the network connection;
   calculating a risk assessment value for the network connection by:

comparing the actual use real-time indicators to the expected use real-time indicators; and increasing the risk assessment value when one of the actual use real-time indicators represents a greater use than a corresponding one of the expected use real-time indicators; and performing a security action for the network connection based on the calculated risk assessment value by sending a warning alert to a user of the computing device based on the risk assessment value comprising a relatively low level of the network attack risk; and shutting down a port for the network connection based on the risk assessment value comprising a relatively high value of network attack risk.

9. The system of claim 8, wherein performing the security action comprises: sending an informative alert to a user of the computing device based on the risk assessment value based on the risk assessment value comprising a relatively low level of network attack risk.

10. The system of claim 8, wherein the usage profile comprises a connection profile and an associated baseline, wherein the connection profile comprises:
- a location of a user of the computing device;
- an indicator that the user is participating in an event; and
- an indicator whether a plurality of currently open network connections are from known connection sources.

11. The system of claim 10, wherein the baseline comprises:
- an average upload bandwidth rate; and
- an average download bandwidth rate.

* * * * *